United States Patent [19]
Wiggins

[11] 3,771,543
[45] Nov. 13, 1973

[54] HYDRAULIC FLOW DIFFERENCE SENSOR AND SHUTOFF APPARATUS

[75] Inventor: Don A. Wiggins, Saugus, Calif.

[73] Assignee: Textron Inc., Providence, R.I.

[22] Filed: May 22, 1972

[21] Appl. No.: 255,743

[52] U.S. Cl............................ 137/100, 137/625.62
[51] Int. Cl. ........................................... G05d 11/02
[58] Field of Search..................... 137/87, 100, 498, 137/504, 625.62; 73/208

[56] References Cited
UNITED STATES PATENTS

| | | | |
|---|---|---|---|
| 1,558,529 | 10/1925 | Wunsch | 137/100 |
| 2,493,906 | 1/1950 | Wishart | 137/87 X |
| 3,233,623 | 2/1966 | Gray | 137/625.62 X |
| 3,408,865 | 11/1968 | Chenault | 73/208 |
| 3,502,102 | 3/1970 | Maltby | 137/498 |

FOREIGN PATENTS OR APPLICATIONS 1,807,335  7/1969  Germany ....................... 137/625.62

Primary Examiner—William R. Cline
Attorney—Billy A. Robbins et al.

[57] ABSTRACT

A shutoff valve mechanism is placed in a hydraulic system line extending between a source of hydraulic fluid under pressure and a utilizing apparatus such as a subsystem or a hydraulic actuator. Variable orifices disposed in the source and return flow paths produce pressure drops which vary linearly proportional with flow rate. The pressure drops are compared and in the event of a predetermined difference therebetween, the shutoff valve is actuated to isolate system pressure.

7 Claims, 5 Drawing Figures

HYDRAULIC FLOW DIFFERENCE SENSOR AND SHUTOFF APPARATUS

BACKGROUND OF THE INVENTION

It has long been desirable to provide apparatus whereby a loss of hydraulic fluid can be prevented in the event a rupture or leak occurs in a branch circuit which is included as part of the overall system. If such leakage cannot be precluded, then substantially the entire source of hydraulic fluid is dissipated through the rupture or leak, thus rendering the entire hydraulic system inoperable to the ultimate malfunction of the apparatus in which the system is included. Prior art apparatus to accomplish the foregoing has included fuse-type hydraulic shutoff valves which are operable only in the event the flow rate of hydraulic fluid exceeds a certain predetermined design value. With such devices, it was found that in the event a relatively small leak occurs not permitting the designed flow rate indicative of failure, the leak was undetected with the ultimate result of system failure. In addition, such fuse-type valves are usually incapable of detecting transient flow surges as distinguished from a rupture in the branch line and tend, therefore, to shut off the flow to the utilizing apparatus in the event of such a transient surge.

To overcome the foregoing disadvantages, flow-operated shutoff valves have been constructed which effectively compare the rate of flow in the source and return flow paths leading to and from the utilizing apparatus and develop through flow control orifices a pressure drop which is applied directly to a piston so that resultant forces are compared which tend to move a control spool into such a position as to shut off the flow of fluid from the source. Although such apparatus operate extremely well in the event of a major rupture, it has been found that when a relatively small difference exists between the source and return flow rates, the apparatus is not capable of actuating the shutoff valve in response to such differences.

FIELD OF THE INVENTION

This invention relates to hydraulic systems such as employed on vehicles, aircraft, ships and the like, and more specifically to sensing, controlling and maintaining the flow of vital fluid. More specifically, the invention relates to a shutoff apparatus responsive to flow rate difference between two critical points in a fluid stream which will sense leaks occurring between such points and isolate the same.

SUMMARY OF THE INVENTION

First and second means for producing first and second pressure drops which vary linearly proportional to flow rates in first and second critical flow paths respectively. Means for comparing the first and second pressure drops and providing an output signal in response to a predetermined magnitude of difference therebetween. Means responsive to the output signal for shutting off fluid flow.

In a more specific aspect of the present invention, there is provided apparatus in the form of variable orifices which detect extremely minute differences in flow rates between the fluid system source and return flow paths to and from a utilizing apparatus. The variable orifices produce pressure drops which are applied to amplifier means and therethrough to a shutoff valve. Thus relatively weak signals are useful in operating the shutoff valve which has not heretofore been possible. Such apparatus is capable of operating in the event of a steady state operational condition wherein no fluid flow demand is being placed upon the system by the utilizing apparatus other than that required to accommodate normal leakage. On the other hand, it is capable of operating in the event of major demands by the utilizing apparatus upon the system. In either event, the apparatus can detect relatively minute flow rate differences, amplify the same, and utilize the amplifier signal to effect shutoff of fluid flow in the event of predetermined discrepancy between the flow rates.

DESCRIPTION OF AN EMBODIMENT OF THE INVENTION

Figure 1:
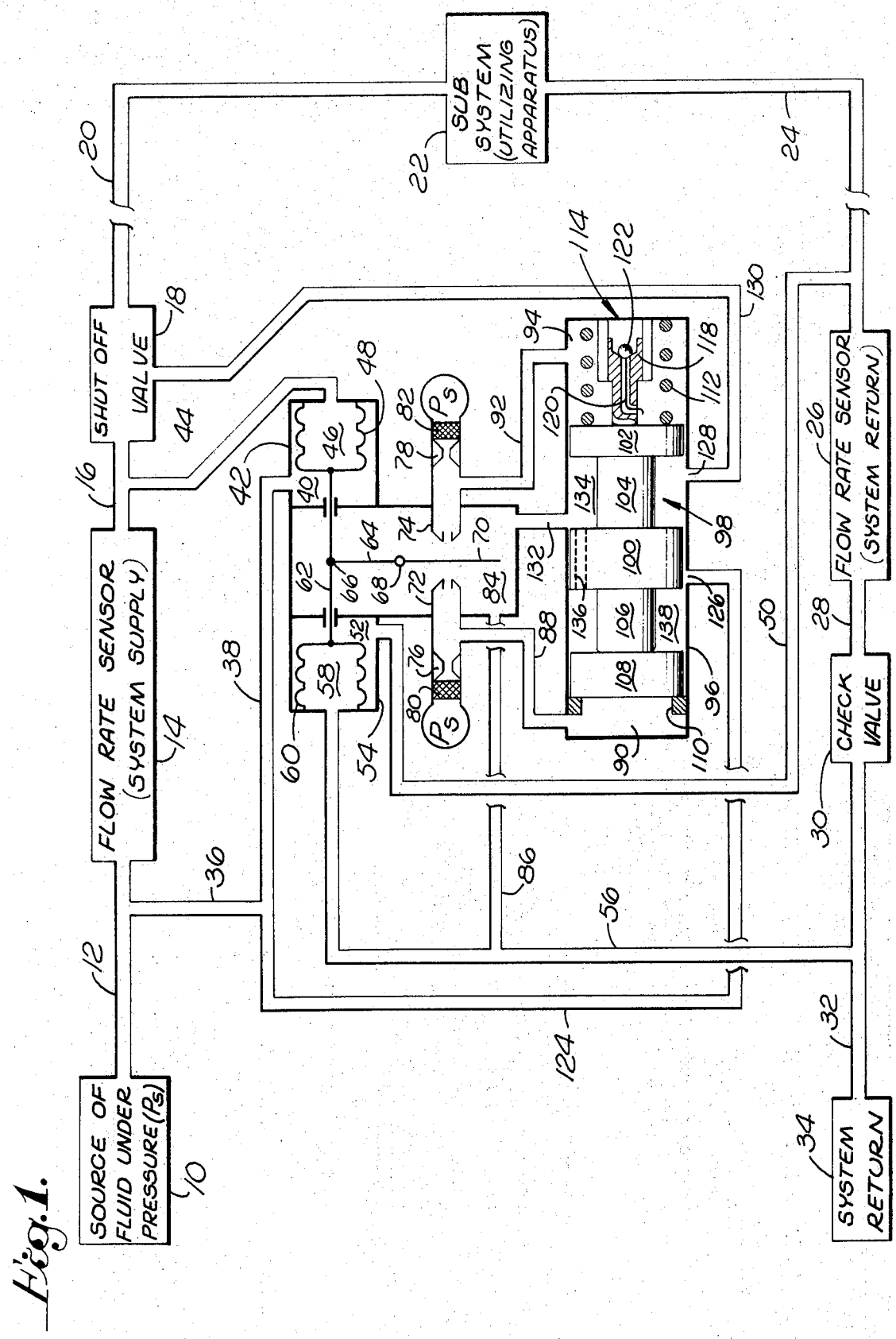
FIG. 1 is a schematic representation partly in block form illustrating apparatus constructed in accordance with the present invention.

Referring now to FIG. 1, there is schematically illustrated a shutoff apparatus which is actuated by sensing the difference in flow between first and second fluid flow paths constructed in accordance with the present invention. As is therein shown, a source of fluid under pressure ($P_s$) 10 is connected by a conduit 12 to a flow rate sensor 14. As is indicated by the parenthetical description (system supply) the flow rate sensor 14 is connected in the first fluid flow path which is connected to the source of fluid under pressure or system supply. The flow rate sensor, as will be described more fully hereinafter, produces a pressure drop thereacross which is linearly proportional to flow rate therethrough. The flow rate sensor 14 is connected by a conduit 16 to a shutoff valve 18 which is normally open. A conduit 20 interconnects a subsystem (utilizing apparatus) 22 to the shutoff valve 18 while an additional conduit 24 connects the subsystem to a flow rate sensor 26 which is in the (system return) fluid flow path. As is indicated by illustrating the conduits 20 and 24 as broken, the utilizing apparatus or substystem 22 may be disposed at any position desired remote from the remainder of the apparatus illustrated in FIG. 1.

A conduit 28 connects the flow rate sensor 26 to a check valve 30 which in turn is connected by a conduit 32 to system return 34 which is the return for the source of fluid under pressure ($P_s$) 10. System source fluid pressure, which exists on the upstream side of the flow rate sensor 14, is conducted through a conduit 36 and conduit 38 to a first chamber 40 positioned within a differential pressure detector 42. A conduit 44 which is interconnected to the conduit 16 conducts the fluid pressure on the downstream side of the flow rate sensor 14 to a second chamber 46 within the differential pressure detector 42. The chambers 40 and 46 are separated by a pressure-sensing flexure means such as the bellows 48. As is well known in the prior art, the bellows 48 will expand or contract depending upon the differences in the fluid pressure appearing in the chambers 40 and 46. Since such systems are well known to the prior art, no further illustration or description thereof will be given herein.

A conduit 50 interconnects the system return fluid pressure, which exists on the upstream side of the flow rate sensor 26, to a first chamber 52 of a second differential pressure detector 54. A conduit 56 interconnects the pressure in existence on the downstream side of the flow rate sensor 26 to a second chamber 58 in the differential pressure detector 54. The chambers 52 and 58 are separated by a second pressure-sensing flexure means such as a second bellows 60 which operates in the manner as described with respect to bellows 48 hereinabove.

A connecting rod 62 is rigidly affixed to the bellows 60 and 48 and moves as the bellows 48 and 60 expand and contract responsive to the presence of differential pressures in their respective chambers. A flapper 64 is pivotally connected at the point 66 to the connecting rod 62. The flapper 64 is pivotally suspended at the pivot point 68 and rotates thereabout. The end 70 of the flapper 64 is suspended between the outlet orifices of a pair of nozzles 72 and 74. Each of the nozzles 72 and 74 is connected through a restriction orifice 76 and 78 respectively and a filter 80 and 82 respectively to system source pressure $P_s$ as is illustrated. The chamber 84 within which the nozzles and the flapper are disposed is connected by way of the conduit 86 and the conduit 56 to the conduit 32 which is connected to system return 34.

The nozzle 72 is connected through the conduit 88 to a chamber 90 while the conduit 92 connects the nozzle 74 to a chamber 94. The chambers 90 and 94 are formed by a way of a cylinder 96. Disposed also within the cylinder 96 is a valve in the form of a spool 98. The spool 98 includes lands 100-102 which are interconnected by a reduced diameter portion 104. A reduced diameter extension 106 from the land 100 abuts a piston 108 which is also disposed within the cylinder 96 and rests against a stop member 110. A spring 112 is disposed within the chamber 94 against one end of the cylinder 96 and abuts the land 102 thereby constantly urging the spool 98 toward the left so that the piston 108 is in contact with the stop 110.

Damper means 114 is also disposed in the chamber 94 and includes the cylinder 116 within which there is disposed a plunger 118 which is connected at one end to the land 102. Disposed internally of the plunger 118 is a flow path 120 having a restriction means 122 at the mouth thereof. The damper means prevents inadvertent operation of the apparatus during transients in the system. Such a damper apparatus is required as a result of the extremely quick response of the detection portion of the system in addition to the compressibility of hydraulic fluid and inherent lag times in the system. Such considerations cause supply and return flow to not be exactly equal, even though a leak does not in fact exist, during the initial part of the transient command.

A conduit 124 is interconnected by way of the conduits 36 and 12 to the system source of fluid under pressure 10 and to a port 126 in the cylinder 96. A port 128 in the cylinder 96 is connected by a conduit 130 to the shutoff valve 18 as will be described more fully hereinafter. An additional conduit 132 connects system return, by way of the chamber 84, to the space 134 within the cylinder 96 between the lands 100 and 102. As a result, under normal operating conditions, that is, when no flow difference is detected, system return is connected through the space 134 to the shutoff valve 18 maintaining the same in a normally open condition. It should be noted that the land 100 closes the port 126 under these conditions. In addition thereto, a conduit 136 is provided through the land 100 interconnecting the spaces 134 and 138 within the cylinder 96, space 138 being defined between the land 100 and the piston 108.

In operation of an apparatus as schematically illustrated in FIG. 1, a break in the conduits 20 or 24 or a malfunction in the subsystem 22 causing leakage of the hydraulic fluid is detected and the shutoff valve is actuated. As an example, assume that a break has occurred in the line 24 thus causing hydraulic fluid to be lost therethrough. Such break in the line 24 creates an additional demand upon the source of fluid under pressure 10 resulting in an increased flow rate of hydraulic fluid. Such increased flow rate of fluid causes an increased drop in pressure across the flow rate sensor 14. Therefore, the pressure appearing in the chamber 40 is increased with respect to the pressure appearing in the chamber 46 of the differential pressure detector 42. Since a break has occurred in the conduit 24, there will be a reduced flow rate through the system return flow path and the flow rate sensor 26. As a result thereof, the overall pressure drop created by the flow rate sensor 26 is less than that which has been created by the flow rate sensor 14. Thus, there will be a reduced pressure differential appearing across the bellows 60.

As a result of the differences in differential pressure, the force created by the increased pressure in the chamber 40 causes the rod 62 to move toward the right as viewed in FIG. 1 rotating the flapper 64 clockwise. The end of the flapper 70 therefore is positioned closer to the orifice of the nozzle 72. As is well known in the prior art, the pressure appearing in the conduit 88 and in the chamber 90 increases as a result of such positioning of the end 70 of the flapper 64 while the pressure appearing in the conduit 92 and the chamber 94 decreases. As a result thereof, the force generated as a result of the increase in pressure in the chamber 90 acting against the outer surface of the piston 108 moves the spool 98 toward the right against the force of the spring 112 and the damper 114. As the spool 98 moves toward the right, the opening into the cylinder 96 by way of the conduit 132 is first closed by the land 100 and then the port 126 is opened, thus removing return from the space 134 and connecting the system pressure to the space 138. System pressure appearing in space 138 immediately propels the spool 98 toward the right to its limit of travel and interconnects system pressure through the space 138, the conduit 136, the space 134, and the conduit 130 to the shutoff valve 18. The shutoff valve 18 then actuates thereby closing the interconnection between the conduits 16 and 20 thus depriving the conduits 20 and 24 and the subsystem 22 of the source of fluid under pressure and isolating the leak. The presence of source pressure in space 138 also locks the spool to the right as viewed in FIG. 1 thereby also locking the shutoff valve in its actuated position so long as source pressure is applied. Upon release of source pressure, the spool and the shutoff valve return to their respective non-actuated positions.

It will immediately be noted by those skilled in the art that in the event the flapper end 70 moves closer to the nozzle 74, nothing will occur since the pressure in chamber 94 increases with respect to that in chamber 90 and the entire apparatus is already against the stop 110. However, it will also be recognized that this condition cannot occur under operating circumstances of apparatus in accordance with the present invention. The nozzle 74 and the accompanying interconnections with respect thereto are utilized to render the system, insofar as the flapper nozzle portion thereof is concerned, insensitive to return pressure variations as normally occur in typical hydraulic systems.

Figure 2:
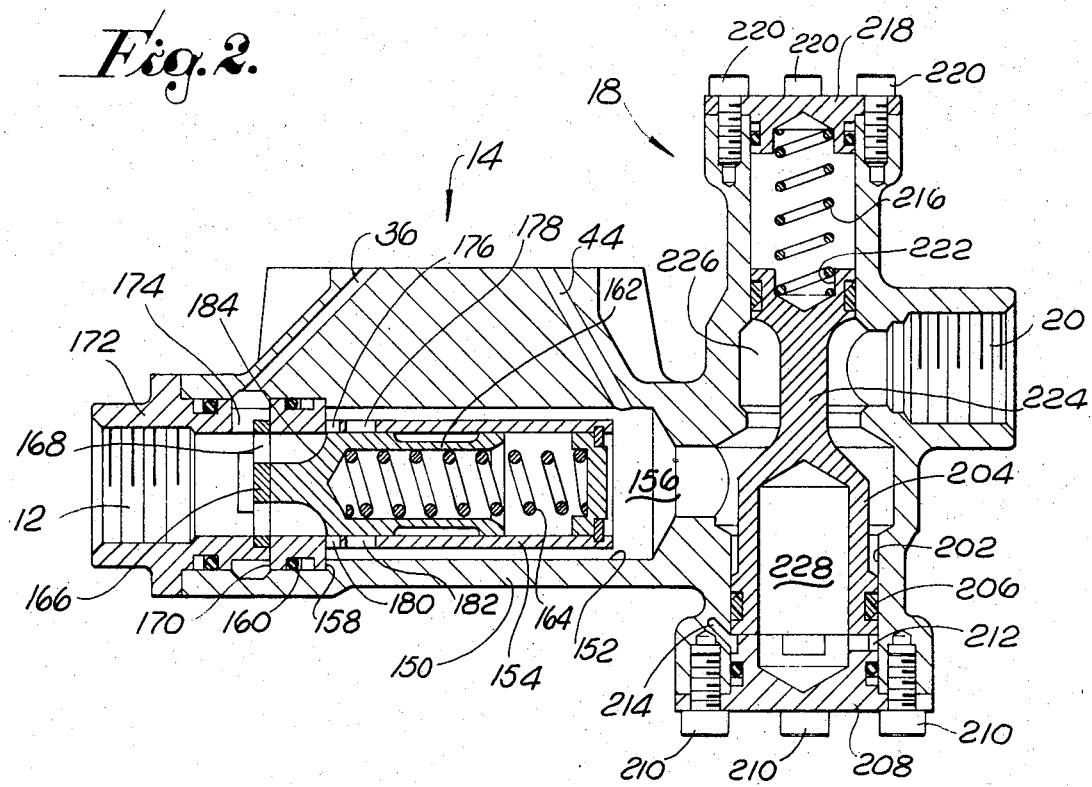
FIG. 2 is a cross-sectional drawing of the source flow path and shutoff valve of apparatus constructed in accordance with the present invention.

Referring now more specifically to FIG. 2, there is illustrated in a cross-sectional view the flow rate sensor 14 and shutoff valve 18. As is shown, there is provided a housing 150 which defines the bore 152. Positioned within the bore is a cylinder 154 which is spaced inwardly from the surface of the bore 152 to provide a flow path 156 surrounding the cylinder 154. The cylinder 154 is positioned against a shoulder 158 as is well known in the art. A hollow piston 162 is slidably disposed within the cylinder 154 and is spring-loaded by a spring 164 so as to be urged constantly toward the left as viewed in FIG. 2. A stop means in the form of a washer 166 having flow ports 168 defined therein is held in place against the outer surface 170 of the cylinder 164 by the fitting 172 through which there is provided communicating openings 174.

A plurality of openings 176, 178, 180 and 182 are provided in the wall of the cylinder 154. When the piston 162 is in the position illustrated in FIG. 2, the plurality of openings 176-182 are closed.

In operation as the fluid under pressure enters through the conduit 12 and into the bore 152 of the housing 150, the fluid pressure thereof is transmitted through the opening 168 and the conduit 36 to the pressure differentialy detecting member 42 as above described. At the same time, the flow of fluid operates against the surface 184 of the piston 162 to move it toward the right against the force of the spring 164. As the piston 162 moves toward the right, the openings 176 and 180 in the surface of the cylinder 154 are gradually opened. The amount of the opening depends upon the amount of force created by the fluid under pressure acting against the piston 162. As the various openings are further opened by the movement of the piston 162, a flow path is created through the conduit 12, the openings 176-182 and the chamber 156 through the conduit 20 as above described.

Figure 3:
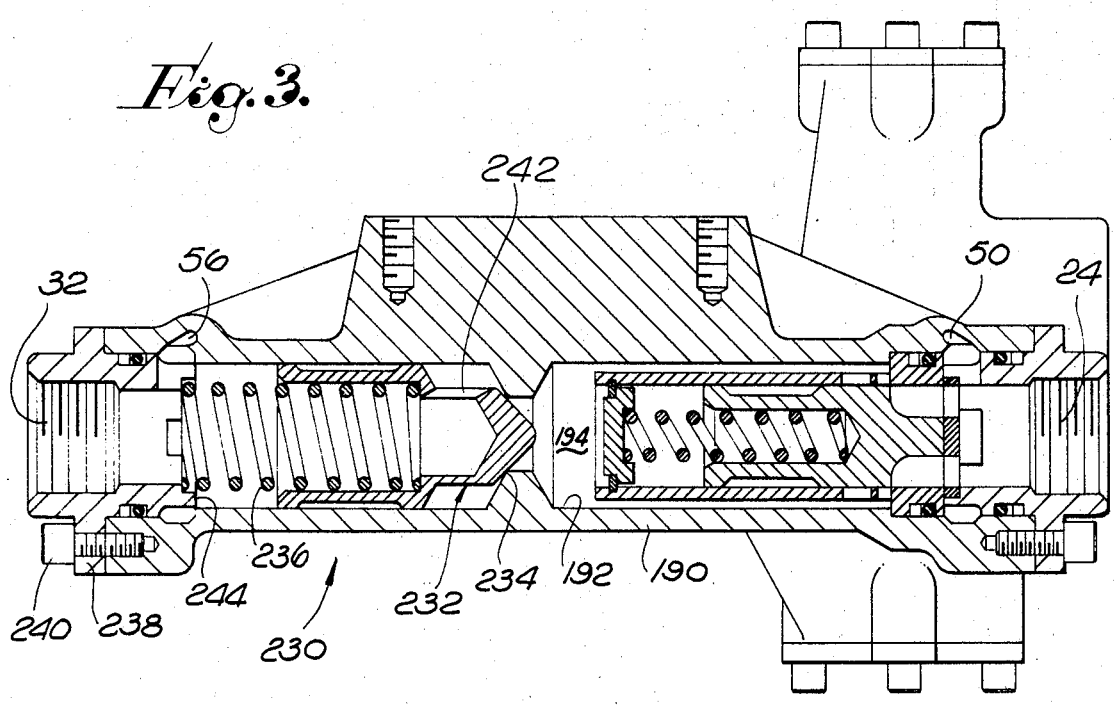
FIG. 3 is a cross-sectional illustration of a return flow path of apparatus constructed in accordance with the present invention.

The construction of the flow rate sensor 26 in the system return flow path is illustrated in detail in FIG. 3 and is identical to that illustrated in FIG. 2 and immediately above described. Therefore the various parts thereof are designated by utilizing the same reference numerals primed as are used in FIG. 2. Thus, it will be recognized that the flow rate sensor and system return is disposed within a bore 192 defined by the housing 190 in such a manner that a flow path 194 is described about the outer surface thereof and through the plurality of openings 176'-182' provided in the cylinder 154' thereof.

In accordance with one of the features of the present invention, it is recognized that to permit an accurate comparison of the flow from the source and to the return, a linear relationship between the differential pressure across the orifice of the flow rate sensor with respect to the flow rate is required. Such a linear relationship allows the establishment of a predetermined difference in the flow rate to the return as compared to the flow rate from the source as the threshold, or minimum, to effect actuation of the shutoff valve. Thus, whether the absolute flow rate be small or large, with the linear relationship, the same differential pressure is produced and the apparatus may be adjusted to respond thereto. In the prior art, where fixed orifices, or orifices with improper sizing, were used, the relationship between flow rate and differential pressure followed a relationship where differential pressure varied proportionally to the square of the flow rate. Thus, for high flow rates in the system, a small difference in source and return flow rate created a large difference in pressure drops across the orifices. However, where very low flow rates were in existence, as during normal steady state operation, a very small difference in pressure drops across the orifices is produced by the same difference in flow rates. Therefore, a different sensing mechanism is needed to detect a leak at low flow rates from that operable at high flow rates. If the prior art system uses the low flow rate differential pressure as the threshold, then the system becomes too sensitive and shuts down spuriously from normal system pressure variations. To provide such a linear relationship, it can be seen from the basic orifice flow equation that it is necessary to permit the flow area of the orifice to change proportionally to the square root of the pressure drop across the orifice. The basic orifice flow equation is:

$$Q = \text{Const.} \times A \times (D_p)^{1/2}$$

Figure 4:
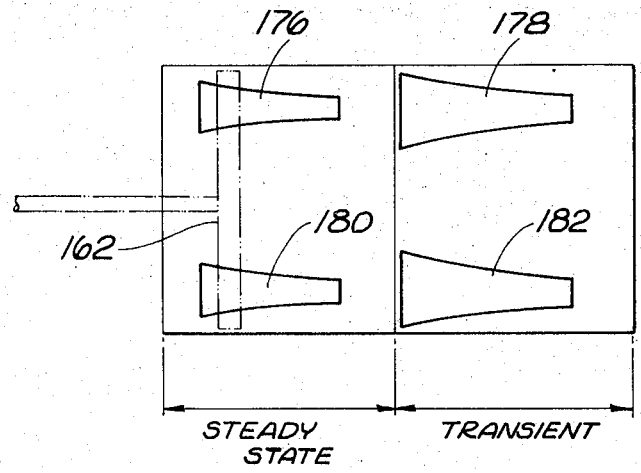
FIG. 4 is a schematic representation of the variable orifice defining portion of the apparatus constructed in accordance with the present invention.

Where:
$Q$ = flow
Const. = constant
$A$ = the area of the orifice
$D_p$ = the pressure drop across the orifice In accordance with the foregoing, the plurality of openings or flow orifices 176-182 in each of the flow rate sensors is constructed as is illustrated generally in FIG. 4 to which reference is hereby made. As is therein illustrated, the areas of flow orifices 176 and 180 are contoured to increase as the piston 162 moves toward the right as viewed in FIG. 4. However, from the flow equation, the area of the flow orifices increases inversely proportional to the square root of the pressure drop across the orifice.

As will also be recognized, the orifices 178 and 182 are larger in size than orifices 176 and 180. When the utilizing apparatus 22 is in a transient condition of operation, such, for example, as when a command has been given to a hydraulic actuator to move from one position to another, there is a temporary but large demand for flow of hydraulic fluid from the source thereof to the utilizing apparatus. Under these flow conditions, the piston 162 is caused to move more drastically than under conditions of steady state operation, that is, when the actuator is merely being maintained in its static condition. As a result, the flow rate sensor must be capable of detecting such differences and still maintaining the capability of comparing the system supply flow rate with system return flow rate to and from the subsystem and detecting differences therebetween as would be in existence in the event of a rupture or other leak in the system. In so doing, however, the increase in area of the flow orifices 178 and 182, which are utilized in the transient operating condition, as well as 176 and utilized in the steady state condition, as such that the variable orifices must still have the area thereof increase inversely proportional to the square root of the pressure drop thereacross. Under these conditions, the linear characteristic above referred to is maintained and the operational characteristic of this system is obtained.

Figure 5:
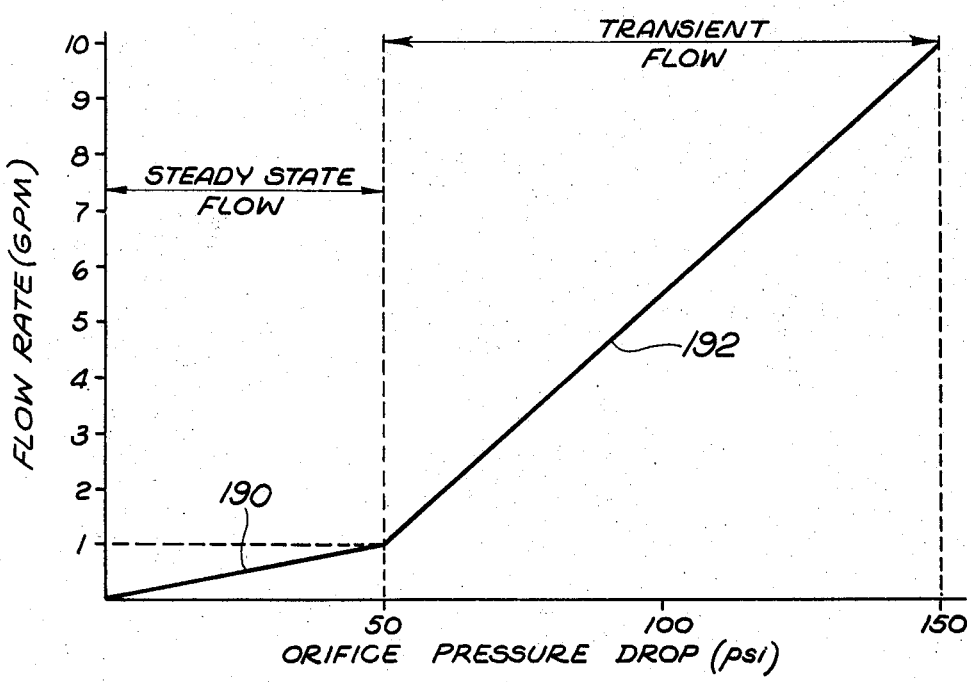
FIG. 5 is a graph illustrating the variation of pressure drop versus flow rate utilizing apparatus constructed in accordance with the present invention.

The linear relationship between the pressure drop across the flow orifice with respect to the flow rate is illustrated in FIG. 5 to which reference is hereby made. As is illustrated in FIG. 5, pressure drop across the orifice is plotted on the abscissa in pounds per square inch while flow rate in gallons per minute is plotted along the ordinate. As illustrated under steady state flow conditions, a linear relationship is maintained along the curve 190 while under transient flow conditions, a greater flow rate is required as illustrated along the curve 192 and a linear relationship is maintained.

Referring again to FIG. 2, the shutoff valve constructed in accordance with the present embodiment of the invention is illustrated. As is therein shown, the housing 150 defines a second bore 202 within which there is positioned a slidable piston 204 which is sealed by an O-ring 206 to the inner surface of the bore 202 as is well known in the art. A cap 208 is held in position over the opening to the bore in seating relationship therewith by bolts 210 as is well known. The inner portion of the capular weight provides a casteoltion 210 through which fluid may be provided by way of the conduit 214 in response to movement of the spool 98 as described in conjunction with FIG. 1. A spring 216 abuts an additional cap 218 which seals the opposite end of the bore 202 and which is held in place by the bolts 220 as illustrated. The spring 216 is received within a bore 222 of the piston 204 and constantly purges the piston toward the cap 208. The two ends of the piston are interconnected by a reduced diameter portion 224 which provides a path for the flow of fluid from the flow 156 through the flow area 226 and out the conduit 20 as illustrated.

In the event a differential pressure difference between the source and return flow paths in the system is detected of sufficient magnitude to cause a translation of the spool 98 as previously described, fluid under pressure is applied through the conduit 130 to the conduit 214 and into the hollow area 228 of the piston 204. The fluid pressure operating against the surface of the piston 204 causes it to translate upwardly as viewed in FIG. 2 against the force of the spring 216 in such a manner as to close the opening between the flow path 156 and the flow path 226 thus shutting off flow of fluid from the source thereof to the conduit 20 as previously described. So long as fluid pressure is maintained within the hollow piston area at 228, the piston is retained in the postiion so that flow is shut off. As soon as the pressure is relieved, the spring 216 returns to the piston 204 to the position shown in FIG. 2 so that flow is once again established.

Referring again to FIG. 3, a check valve is illustrated generally at 230. The check valve 230 includes a popit 232 which seats against a seat 234 provided as a part of the bore 192 of the housing 190. A spring 236 maintains the seat and popit in closed sealed relationship in the event a break occurs in the conduit 24 and fluid is cut off from the source. In this manner, leakage from the return for the system is precluded. The spring 236 is retained in place within the hollow inner portion of the popit 232 and abuts a fitting 238 which is held in place by bolts such as that shown at 240. Flow ports 242 are provided in the popit 234 so that during normal return flow, the popit 232 is translated toward the left and against the stop 244 provided by the fitting 238 thereby permitting fluid flow through the ports 242 and out the conduit 32 to return.

What is claimed is:

1. Apparatus for detecting a flow difference in first and second fluid flow paths and shutting off flow therein comprising:
   A. first means in said first fluid flow path for producing a first pressure drop which varies linearly proportional to changes in the flow of said fluid in said first fluid flow path;
   B. second means in said second fluid flow path for producing a second pressure drop which varies linearly proportional to changes in the flow of said fluid in said second fluid flow path;
   C. comparing means for detecting a difference between said first and second pressure drops and providing an output signal upon a predetermined magnitude of such difference; and
   D. means responsive to said output signal for blocking fluid flow in one of said first and second fluid flow paths.

2. Apparatus as defined in claim 1 wherein said first and second means are variable orifice means the area of which increases proportionally to the square root of the pressure drop.

3. Apparatus as defined in claim 2 wherein said first and second variable orifice means includes first and second cylinders defining contoured flow openings therethrough and piston means for selectively increasing the area of said openings responsive to increased flow therethrough.

4. Apparatus as defined in claim 1 wherein said comparing means includes transducer means and amplifier means.

5. Apparatus as defined in claim 4 wherein said transducer means is a bellows comparator, said amplifier is a double-nozzle flapper valve, and said flapper is positioned by differences in said first and second pressure drops through the comparator.

6. Apparatus as defined in claim 1 wherein said comparing means includes first and second expansible-contractable means connected to receive the pressure differentials across said first and second means for producing said first and second pressure drops respectively.

7. Apparatus as defined in claim 6 wherein said first and second expansible-contractable means is a first and second bellows respectively.

* * * * *